Dec. 29, 1964   C. D. GIBSON ETAL   3,163,253
MATERIALS HANDLING TRUCK
Original Filed June 9, 1960   2 Sheets-Sheet 1

CHRISTIAN D. GIBSON
ORVILLE E. SMITH
INVENTOR

BY Richard Q. Stephens
ATTORNEY

Dec. 29, 1964   C. D. GIBSON ETAL   3,163,253
MATERIALS HANDLING TRUCK

Original Filed June 9, 1960   2 Sheets-Sheet 2

CHRISTIAN D. GIBSON
ORVILLE E. SMITH
INVENTORS

BY Richard H. Stephens

ATTORNEY

United States Patent Office 3,163,253
Patented Dec. 29, 1964

3,163,253
MATERIALS HANDLING TRUCK
Christian D. Gibson and Orville E. Smith, Greene, N.Y., assignors to The Raymond Corporation, Greene, N.Y., a corporation of New York
Continuation of application Ser. No. 35,021, June 9, 1960. This application July 9, 1962, Ser. No. 210,873
9 Claims. (Cl. 180—79.2)

This invention relates to a battery-powered materials handling truck, and more particularly, to an improved power steering and accessory system arrangement for battery-powered materials handling vehicles such as lift trucks. This application is a continuation of our prior copending application Serial No. 35,021, filed June 9, 1960, now abandoned. Battery-powered lift trucks are widely used for a variety of materials handling operations in preference to gasoline-powered or various other types of trucks, particularly in indoor locations, where products of combustion, such as carbon monoxide, would be offensive to building inhabitants and where noise is important to minimize. It is desirable, particularly in the case of narrow-aisle trucks, to minimize the number and size of batteries which must be carried—it being usual to provide sufficient battery capacity to allow continuous operation of a truck throughout most of an eight hour working shift without recharging. If additional battery capacity is required to operate auxiliary systems, such as power steering systems, truck battery ampere-hours and truck battery size capacity must be increased, not only increasing the cost of the truck but requiring an increase in the size of a given truck, thereby decreasing the maneuverability of a given truck in an aisle of given width.

In the case of battery-powered trucks designed for narrow aisle use, very sharp cramp angles are frequently utilized in operation of the usual steering system to enable maneuvering in narrow aisles. With the very heavy wheel loads usually encountered, manual operation through the considerable angles required is extremely difficult, so power steering system are clearly desirable, although they are rare if existent at all, for narrow aisle lift trucks.

In many power steering systems it is usual to provide a source of pressure in the form of an air pressure storage tank. The provision of such a tank for a power steering system is wasteful of space on a narrow aisle lift truck. In addition, use of air pressure to operate a power steering system of a lift truck is undesirable because it would require provision of an air compressor, which cannot be operated economically with an electric motor drive. Thus it is one object of the present invention to provide an improved lift truck having a battery-powered steering system in which no large air pressure tank or other bulky pressure storage unit need be provided.

In a number of other prior art power steering systems it has been usual to derive operating pressure from a large constantly-operating engine which has no counterpart on a battery-operated electric lift truck. It is extremely desirable in the case of lift trucks not to waste battery-power by operating motors constantly. In the case of many hydraulic power steering systems it has been found desirable to restrict powered assist by a power boost unit to steering wheel pressures exceeding a predetermined amount, because powered assist throughout all phases of steering, including small angles, frequently is regarded as unsafe or undersirable, in that overcontrol frequently occurs. In the present invention we provide a lift truck having a steering system selectively controlled by the operator to provide powered assist only when desired by the operator. This arrangement also serves to conserve battery power, which is extremely important in the case of battery-powered lift trucks and which advantage is a cardinal feature of the present invention. Thus it is an important object of the invention to provide an improved power steering system for use on a battery-powered, electric motor-propelled industrial materials-handling truck.

Battery-powered materials handling trucks are usually provided with various accessory mechanisms, such as reach forks, power tilt mechanisms, pusher bars, load clamps and the like, and it is highly desirable to provide adequately operated motive means for such accessory mechanisms with a minimum of additional equipment, to save both cost and space, and provision of such means is an important feature of the invention.

Other objects of the invention will in part be obvious and will in part appear hereinafter.

The invention accordingly comprises the features of construction, combination of elements, and arrangement of parts, which will be exemplified in the construction hereinafter set forth, and the scope of the invention will be indicated in the claims.

For a fuller understanding of the nature and objects of the invention reference should be had to the following detailed description taken in connection with the accompanying drawings, in which.

Figure 1:
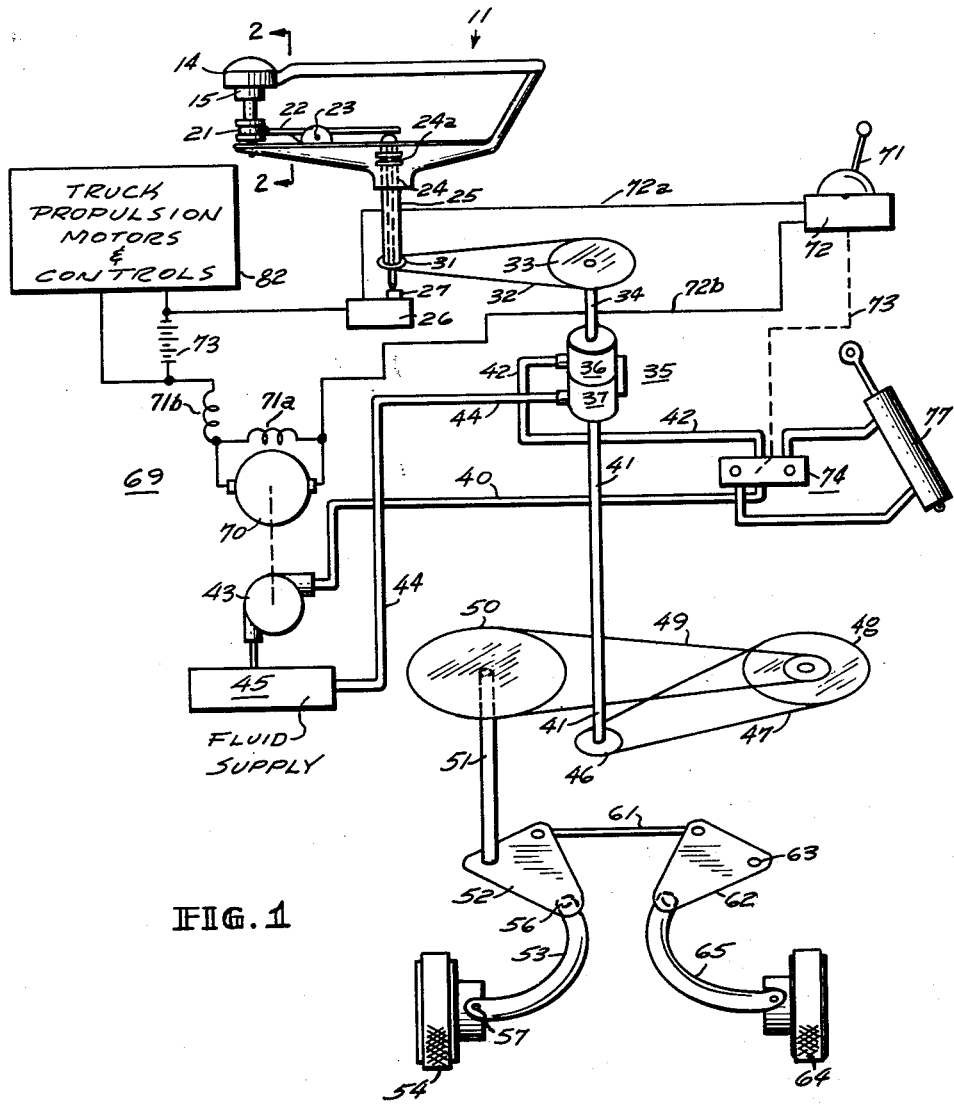
FIG. 1 is a schematic diagram of one embodiment of the present invention.
Figure 2:
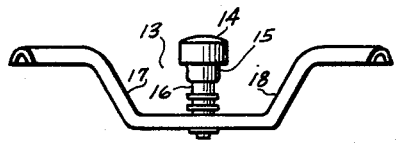
FIG. 2 is a section along lines 2—2 in FIG. 1, showing a portion of a safety steering wheel which may be used in conjunction with the present invention.
Figure 3:
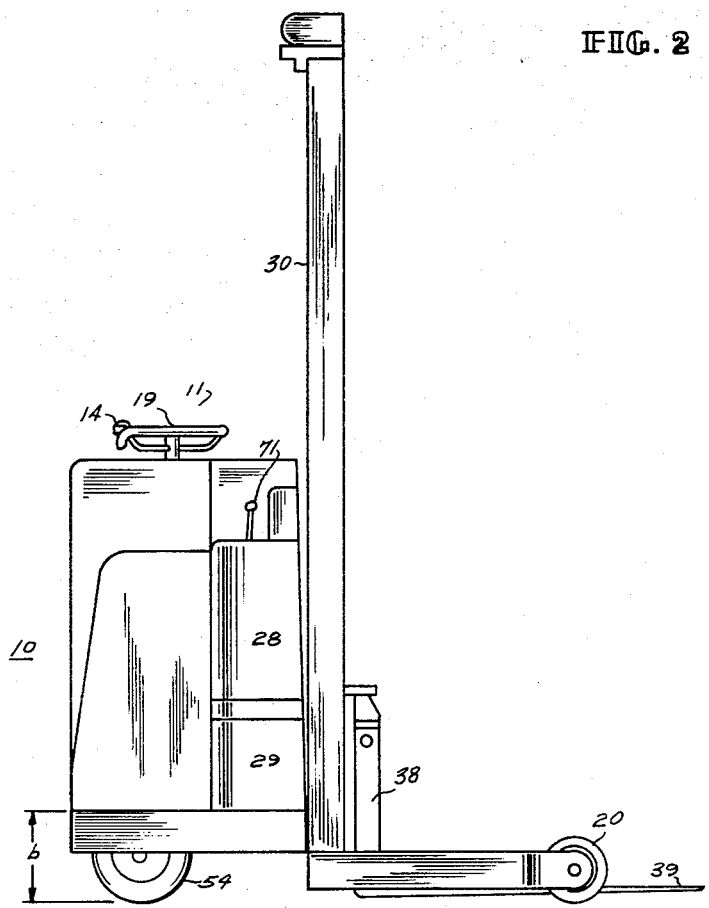
FIG. 3 is a view of a typical narrow-aisle material handling lift truck equipped with the invention.

Referring now to the FIGURES, it will be seen that lift truck 10 is provided with a steering wheel 11, the main plane 19 of the rim of which is generally horizontal, for control by a standing operator, who stands on a platform at a distance $b$ above the floor, and steers truck 10 with wheel 11, which for the normal size operator is approximately at hip height. Lift truck 10 is provided with one or more steerable drive wheels 54, only one of which is shown in FIG. 3, and a pair of rigid load-carrying front wheels 20, only one of which is shown in FIG. 3. Cabinets 28, 29 contain the electric storage battery. The truck is provided with a vertical mast structure 30, and hydraulic rams (not shown) are provided for lifting and lowering a load carriage (not shown) which is positioned between a pair of vertical beams spaced laterally apart to form mast 30. The load carriage is in its lowest possible position in FIG. 3. A reach mechanism (not shown) retracted longitudinally inside the load carriage is operable to extend longitudinally and retract a fork lift assembly 38, which carries a pair of load forks 39, only one of which is shown in FIG. 3. By retracting a load with the reach mechanisms so that its center of gravity approaches the wheelbase midpoint, the longitudinal stability of the truck is greatly increased without the need for counterbalancing and without adversely affecting maneuverability by increasing truck length. An exemplary reach mechanism of the type described is shown in the copending application Ser. No. 34,895, filed June 9, 1960, by Christian D. Gibson, and assigned to the same assignee as the present invention. Referring now to FIGS. 1 and 2, it will be seen that wheel 11 extends almost circumferentially throughout a plane 19, with a slopingly recessed portion 13 provided to accommodate spinner knob 14, with the top of spinner knob 14 approximately flush with the main plane 19 of wheel 11. A bearing post 16 rotatably carries spinner knob 14, which is movable vertically also through short distances to actuate a switch, as will be described in more detail below.

By recessing spinner knob 14 in depression 13, operator hand injuries due to wheel "kick-back" are minimized. If the wheels of the vehicle strike an impediment tending to cause rapid rotation of wheel 11, which phenomenon is quite common in operation of industrial lift trucks, one sloping side (17 or 18) of depression 13 serves to push the operator's hand clear of spinner knob 14 as soon as wheel rotation begins. While the power steering system to be described usually prevents "kick-back" when powered, the system operates in both powered and unpowered modes, and "kick-back" may occur while operating in the unpowered mode. Also, "kick-back" sometimes occurs when the steering system is turned far enough to strike one of its turn limits, due to resiliency in the linkages of the system. Previous steering wheels, if provided with any safety means at all, usually mounted their spinner knobs to project up from the main plane 19 of the steering wheel rim, with sloping shoulders extending upwardly toward the upper extremity of the spinner knob, so that one or the other of the shoulders would push the operator's hand out of the way if uncontrolled wheel rotation occurred. Such prior safety steering wheels had the disadvantage that approximately one complete revolution of the steering wheel had to occur in order for them to push the operator's hand out of the way, while much less rotation is necessary with the present steering wheel. Since wheel 11 pushes the operator's hand out of the way before appreciable wheel rotation can occur, the wheel and spinner knob 14 cannot reach a high speed before the operator's hand is removed, thereby considerably decreasing the maximum speed at which knob 14 can strike the operator's hand, and thereby lessening the danger of injury.

It will be seen that if knob 14 is squeezed, so that bottom member 15 is pulled upwardly against the force of a spring 24a mounted to urge rod 24 upwardly, collar portion 21 serves to lift and rotate lever 22 about pivot 23, thereby pushing rod 24 downwardly through the center of steering wheel 11, and through hollow steering column 25, and actuating a momentary contact limit switch 26. The operating plunger 27 of limit switch 26 is urged outwardly by spring means (not shown), and spring 24a urges rod 24 upwardly, so that rod 24 will be returned and bottom member 15 of knob 14 will move downwardly when pressure is relaxed on spinner knob 14. As will be explained in more detail below, squeezing of spinner knob 14, so that lower member 15 is pulled upwardly, serves to switch on power boost, and subsequent relaxation of knob 14 will remove power boost. Steering direction is controlled, of course, by rotation of steering wheel 11. Because the means utilized to selectively control power boost are located as shown, the truck operator can easily steer the truck with one hand, switching power boost on and off as desired. Furthermore, it will be seen that the act of turning wheel 11 may or may not involve squeezing spinner knob 14, so that turning at speeds where power assist is unnecessary does not accidentally switch on power assist. Furthermore, when knob 14 is being squeezed and power assist is being used, rotation of steering wheel 11 through plural revolutions may be effected easily without requiring interruption of power assist or temporary use of two hands.

Sprocket 31 rigidly affixed to steering column 25 drives chain 32, which in turn drives sprocket 33 and the input shaft 34 of a known type of hydraulic torque amplifier 35. Torque amplifier 35 preferably comprises a hydraulic position servomechanism, which is shown in block form in FIG. 1. Application of input torque via input shaft 34 displaces a servo valve 36 from a null position with respect to the output shaft, against the force of a centering spring (not shown). Displacement of the valve directs fluid to a fluid motor 37 to cause it to run in the same direction as the input torque. In the absence of an input torque the fluid merely circulates through the torque amplifier without driving the fluid motor. It is important for steering purposes that a positive mechanical "through drive" exist between input shaft 34 and output shaft 41, in order to allow the driving of output shaft 41 without hydraulic boost in the absence of hydraulic pressure. A device which has been found eminently suitable for use in the present invention is the Model S-103 hydraulic "Torque Booster," manufactured by the Char-Lynn Company, Minneapolis, Minn., the structure and operating principles of which are shown in Patent No. 2,821,171 (and Reissue Patent No. 25,291). This particular torque amplifier is provided with a "gerotor" type of fluid motor, which has an inherent gear reduction or torque multiplication characteristic especially useful for power steering, since it enables provision of very high torque at the low output shaft speeds usually used in steering. Since a variety of suitable torque amplifiers are known in the art, and since the present invention does not lie in the details of a particular torque amplifier, further description of the internal details of torque amplifier 35 is believed to be unnecessary.

Rotation of wheel 11 rotates input shaft 34 of hydraulic torque amplifier 35, which in turn rotates output shaft 41. Torque amplifier 35 is provided with hydraulic pressure via input conduit 42 fed from a gear-type high pressure hydraulic pump 43 via an accessory control valve 74. A hydraulic exhaust conduit 44 connects to a small fluid storage tank 45. In the absence of application of hydraulic pressure to torque amplifier 35, the steering torque applied via input shaft 34 is repeated without amplification at output shaft 41, rotating sprocket 46. Shaft 51 is driven by sprockets 46, 48 and 50 and chains 47 and 49 in a geared-down arrangement which multiplies the steering torque by a constant factor. Rotation of shaft 51 rotates steering tie plate 52 about the axis of shaft 51, thereby rotating wheel 54 through drag link 53, which is pivotally mounted at 56 to plate 52 and at 57 to wheel 54. Rotation of shaft 51 and plate 52 also reciprocates tie rod 61, thereby rotating steering tie plate 62 about pivot point 63, and similarly rotating wheel 64 by means of drag link 65. The invention has been used extensively with success in connection with novel "motor-wheel" drive wheels of a type shown in the copending application of Christian D. Gibson, Serial No. 34,982, filed on June 9, 1960, and assigned to the same assignee as the present invention. The invention may be used, however, with any lift truck having one or more dirigible wheels, regardless of whether they are powered wheels. Also, a variety of different steering linkage arrangements are known in the art for minimizing tire scrubbing and increasing maneuverability, and the present invention may be used with most of them.

During travel at relatively high velocities, wheels 54 and 64 may be steered easily, and no powered assistance is necessary. At standstill or low truck velocities, however, considerable steering torque may be necessary at shaft 51 to turn wheels 54 and 64, and powered assist then is highly desirable. By squeezing spinner knob 14 to close switch 26, the operator closes a circuit to energize motor 69, which preferably comprises a compound-wound D.C. motor shown as comprising armature 70, shunt field 71a and series field winding 71b. Motor 69 is mechanically connected to drive gear-type hydraulic pump 43, the pressure side of which feeds torque amplifier 35 via a series loop hydraulic circuit to be described, and the input side of which is fed from the hydraulic fluid storage well 45. Motor 69 is connected to be powered by the same battery 73 that is used to propel the truck. Since the details per se of the particular electric motor propulsion system form no part of the present invention, the electrical propulsion motor system is represented simply as block 82 in FIG. 1. The same battery 73 is used, in some cases, to operate various other devices (not shown) on the truck, such as reach forks, load clamps, power tilt mechanism, pusher bars and the like. In fact, motor 69 and pump 43 may be used to operate equipment in addition to steering mechanism. For example, since reach forks properly are never operated while the truck is traveling and since power steering is not used at times when the reach forks are used, the high pressure side of pump 43 is shown routed in a series loop which includes control valve 74 for reach fork hydraulic cylinders as well as torque amplifier 35 of the power steering system, and actuation of a reach fork control lever 71 is arranged to operate motor 69 to build up hydraulic pressure and also displace control valve 74 to direct hydraulic fluid flow to the reach fork hydraulic actuating cylinders. In the arrangement shown in FIG. 1, reach fork or pusher bar control lever 71, a momentary, spring-centered lever, operates electrical switch means 72, which is connected electrically in parallel with steering switch 26 by means of conductors 72a and 72b. Control lever 71 also is mechanically connected by means shown simply as dashed line 73 to control reach mechanism hydraulic control valve 74. The hydraulic series loop may be traced from conduit 40 on the high pressure side of hydraulic pump 43 to control valve 74, through conduit 42 to torque amplifier 35, via exhaust conduit 44 to tank 45, which supplies pump 43. As mentioned above, fluid circulates freely through torque amplifier 35 when no input steering torque from the steering wheel is being applied to the torque amplifier, and hence an open exhaust path exists for fluid from control valve 74 when the truck is not being steered but is stationary and the reach forks or other mechanism is being operated. Control valve 74 also allows free circulation of fluid from conduit 40 to conduit 42 when lever 71 is not being held off of its spring-centered position, so that a free fluid supply path exists between pump 43 and torque amplifier 35 when reach fork lever 71 is not being operated. It may be noted that high pressure will be present on the exhaust side of valve 74 as well as on the inlet side, so that a control valve having pressure exhaust must be used. Thus by operation of control lever 71, motor 70 is switched on to build up pressure instantaneously in lines 42 and 75, and control valve 74 is actuated to control the extension and retraction of hydraulic motive means shown as comprising a bi-directional hydraulic ram 77. Thus it will be seen that electric motor 69, hydraulic pump 43 and the hydraulic fluid system may serve to operate an accessory device, such as reach forks, a power tilt mechanism, a load clamping mechanism, or like devices as well as to operate the power steering systems, resulting in considerable savings in cost and space.

Upon application, almost immediately of hydraulic operating pressure to torque amplifier 35, the capability of power assisted steering results, but if the operator is not applying an input steering torque to shaft 34 when he squeezes spinner knob 14, the build up of pressure in line 42 and the application of pressure to torque amplifier 35 do not cause any rotation of output shaft 41, and fluid merely circulates through torque amplifier 35. As the operator applies input steering torque to shaft 34 while hydraulic operating pressure is applied to torque amplifier 35, the input steering torque displaces the servo valve 36 of torque amplifier 35, admitting hydraulic pressure to drive fluid motor 37 in the desired direction. Since displacement of servo valve 36 from a mean position depends upon the amount of input steering torque applied to input shaft 34, the rate at which the wheels and truck are turned depends upon steering effort exerted, in roughly a proportional manner. Even though motor 69 and pump 43 rapidly build up pressure to operating maximum as soon as limit switch 26 is closed, maximum pressure is not suddenly applied to turn the wheels, unless, of course, the operator is applying great turning effort to the steering wheel before he squeezes spinner knob 14. It will be apparent that such a combination of actions can only be done by the operator if done deliberately, so that the dangers of accidental turning at sharp and sudden angles are minimized.

The speed characteristic of motor 69 and the speed-pressure characteristic of pump 43 are chosen with relation to the voltage of battery 73 so that operating pressure builds up very rapidly, almost instantaneously, in conduit 40 when switch 26 is closed. In a highly successful commercial embodiment of the invention the battery voltage of 24 volts drives a 1 H.P. motor, rapidly accelerating to a speed of approximately 2500 r.p.m. and building up a hydraulic pressure of approximately 1000 p.s.i. in a small fraction of a second. The Model S–103 torque booster mentioned above provides 615 in.-lbs. output torque when supplied with hydraulic fluid at 1000 p.s.i, and 1 g.p.m. of fluid flow produces 33 r.p.m. at output shaft 41.

It is very important to note that during much truck operating time, while the truck is traveling in a straight line or exceeding some low speed, that power assist is neither necessary nor desirable, and any steering system which requires dissipation of battery power during such time is unnecessarily wasteful and uneconomical. In the present invention since motor 69 runs only when the operator squeezes spinner knob 14 to actuate limit switch 26, no battery power need be wasted, and extra battery and battery rack capacity are not needed to accommodate the power steering system. It also is important to note that the steering system of the present invention requires neither the sizeable pressure storage tank nor the large constantly-running engine which were used alternatively in most prior art power steering systems as sources of energy for power steering systems.

It will thus be seen that the objects set forth above, among those made apparent from the preceding description, are efficiently attained, and since certain changes may be made in the above construction without departing from the scope of the invention, it is intended that all matter contained in the accompanying drawing shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim as new and desire to secure by Letters Patent is:

1. A battery-powered materials handling truck having a power-assist steering arrangement, comprising in combination: a materials handling truck having at least one electric propulsion motor and a battery, said propulsion motor being connectable to said battery to propel said truck; a steering wheel located at an operator's position on said truck and rotatable by an operator to steer said truck; a hydraulic torque amplifier mechanically connected to said steering wheel so that torque applied to said steering wheel is applied as an input torque to said torque amplifier; linkage means mechanically connecting output torque from said torque amplifier to steer at least one dirigible wheel of said truck; a second electric motor electrically connected to be powered by said battery; a hydraulic pump connected to be driven by said second electric motor to provide hydraulic operating pressure for said torque amplifier; and a switch operable upon actuation by said operator to control said second electric motor.

2. A battery-powered materials handling truck having a power-assist steering system, comprising in combination: a materials handling truck having at least one electric propulsion motor and a battery, said propulsion motor being powered by said battery to propel said truck; linkage means connected to steer at least one dirigible wheel of said truck; a hydraulic torque amplifier mechanically connected to apply its output torque to said linkage means to steer said dirigible wheel, said torque amplifier being mechanically connected to receive an input torque and operable upon application of hydraulic operating pressure to amplify said input torque and provide said output torque, said amplifier being operable in the absence of hydraulic operating pressure to apply said input torque directly to said linkage means without amplification; a steering wheel located at an operator's position on said truck and operable by an operator to steer said truck, said steering wheel being mechanically connected to apply said input torque to said torque amplifier; a second electric motor powered from said battery and mechanically connected to drive a hydraulic pump to provide said hydraulic operating pressure when said second motor is electrically energized; and an electrical switch mounted on said steering wheel and operable by said operator to control running of said second electric motor.

3. A power steering arrangement according to claim 1 in which said torque amplifier comprises a bi-directional control valve and a reversible fluid motor, said input torque being applied to displace said control valve and thereby apply hydraulic pressure to drive said fluid motor in a selected direction, said fluid motor producing said output torque.

4. A power steering arrangement according to claim 1 in which said second electric motor comprises a compound-wound direct current motor and in which said hydraulic pump comprises a gear-type hydraulic pump mechanically driven by said second electric motor.

5. A power steering arrangement according to claim 1 in which said switch comprises an electrical switch mounted on said steering wheel to control starting, stopping and running of said second electric motor.

6. Apparatus according to claim 1 in which said torque amplifier is mechanically connected to said steering wheel by means of a first torque-increasing gearing connection and in which said linkage means is connected to said torque amplifier through a second torque-increasing gearing connection.

7. Apparatus according to claim 1 in which said truck is provided with a hydraulically-operated accessory mechanism controlled by an operator's accessory control; a second electrical switch means connected to be operated by said accessory control; said second switch being connected in parallel with said first switch; and a control valve operated by said accessory control to control application of said hydraulic operating pressure to said accessory mechanism.

8. A power steering arrangement according to claim 1 in which said steering wheel is located at said operator's position with the main plane of said steering wheel horizontal, said steering wheel being provided with a slopingly recessed rim at a portion of its circumference to flush mount a spinner knob.

9. Apparatus according to claim 7 in which said accessory control valve and said torque amplifier are connected in a series loop hydraulic circuit, said accessory control valve allowing free internal flow of fluid when said accessory control is not being operated and said torque amplifier allowing free internal flow of fluid when no input torque is being applied to said steering wheel.

References Cited by the Examiner

UNITED STATES PATENTS

| | | | |
|---|---|---|---|
| 2,167,224 | 7/39 | Ulinski | 180—79.1 |
| 2,311,321 | 2/43 | Zigan | 180—79.1 |
| 2,650,669 | 9/53 | Hammond | 180—79.2 |
| 2,827,123 | 3/58 | Lincoln et al. | 180—79.2 |
| 2,828,829 | 4/58 | Lincoln et al. | 180—79.2 |
| 3,083,533 | 4/63 | Schenkelberger | 180—79.2 |

A. HARRY LEVY, *Primary Examiner.*

PHILIP ARNOLD, *Examiner.*